(12) United States Patent
Engerman

(10) Patent No.: US 11,577,604 B2
(45) Date of Patent: Feb. 14, 2023

(54) VEHICLE SYSTEM WITH MULTIPLE ELECTRIC DRIVE AXLES

(71) Applicant: Dana Automotive Systems Group, LLC, Maumee, OH (US)

(72) Inventor: Eric M. Engerman, Novi, MI (US)

(73) Assignee: Dana Automotive Systems Group, LLC, Maumee, OH (US)

(*) Notice: Subject to any disclaimer, the term of this patent is extended or adjusted under 35 U.S.C. 154(b) by 374 days.

(21) Appl. No.: 16/795,263

(22) Filed: Feb. 19, 2020

(65) Prior Publication Data

US 2021/0252977 A1    Aug. 19, 2021

(51) Int. Cl.
| | |
|---|---|
| *B60K 1/02* | (2006.01) |
| *B60K 17/356* | (2006.01) |
| *F16H 37/04* | (2006.01) |
| *B60K 7/00* | (2006.01) |
| *B60L 50/60* | (2019.01) |
| *B60K 6/26* | (2007.10) |

(Continued)

(52) U.S. Cl.
CPC ........... *B60K 17/356* (2013.01); *B60K 1/02* (2013.01); *F16H 37/046* (2013.01); *B60K 6/26* (2013.01); *B60K 6/365* (2013.01); *B60K 6/52* (2013.01); *B60K 17/046* (2013.01); *B60K 2007/0038* (2013.01); *B60L 50/60* (2019.02); *B60Y 2200/91* (2013.01); *B60Y 2200/92* (2013.01); *B60Y 2400/82* (2013.01); *F16H 2200/0021* (2013.01); *F16H 2702/02* (2013.01)

(58) Field of Classification Search
CPC .......... B60K 17/356; B60K 1/02; B60K 6/26; B60K 6/365; B60K 6/52; B60K 17/046; B60K 2007/0038; B60K 17/354; B60K 2001/001; B60K 1/00; B60K 17/02; B60K 17/04; B60K 17/12; B60K 17/16; F16H 37/046; F16H 2200/0021; F16H 2702/02; F16H 37/082; F16H 3/091; F16H 3/10; F16H 2200/0034; B60L 50/60; B60L 2220/42; B60L 2260/26; B60L 15/2054; B60Y 2200/91; B60Y 2200/92; B60Y 2400/82
See application file for complete search history.

(56) References Cited

U.S. PATENT DOCUMENTS 11,305,640 B2 * 4/2022 Gaither ................ B60K 11/085
2017/0023114 A1 * 1/2017 Wang ....................... B60K 1/00
(Continued)

FOREIGN PATENT DOCUMENTS

WO     WO-2019161395 A1 *   8/2019   ........... B60B 35/122

OTHER PUBLICATIONS

Engerman, E., "Electric Drive Axle System With a Self-Indexing Clutch and Method for Operation of Said Clutch," U.S. Appl. No. 16/794,703, filed Feb. 19, 2020, 51 pages.
(Continued)

*Primary Examiner* — Justin Holmes
(74) *Attorney, Agent, or Firm* — McCoy Russell LLP

(57) ABSTRACT

Methods and systems are provided for a vehicle system. In one example, the vehicle system includes a first electric drive axle assembly and a second electric drive axle assembly. Each of the first and second axle assemblies has a gear train with a planetary gear set axially offset from a motor-generator. Each planetary gear set is rotationally coupled to a differential.

18 Claims, 9 Drawing Sheets

(51) Int. Cl.
  *B60K 17/04* (2006.01)
  *B60K 6/52* (2007.10)
  *B60K 6/365* (2007.10)

(56) References Cited

U.S. PATENT DOCUMENTS

2020/0096084 A1* 3/2020 Engerman ............... F16H 3/006
2021/0237568 A1* 8/2021 Liu ........................ B60K 1/00

OTHER PUBLICATIONS

Nahrwold, T., "Dig Mode System and Method for Vehicle," U.S. Appl. No. 16/794,618, filed Feb. 19, 2020, 36 pages.
Engerman, E. et al., "Electric Axle System With Removable Planetary Gear Assembly," U.S. Appl. No. 16/794,643, filed Feb. 19, 2020, 50 pages.
Nahrwold, T., "Sand Mode System and Method for a Vehicle," U.S. Appl. No. 16/794,647, filed Feb. 19, 2020, 33 pages.
Engerman, E., "Electric Drive Axle Gear Train and Method for Manufacturing Said Gear Train," U.S. Appl. No. 16/794,654, filed Feb. 19, 2020, 48 pages.
Wesolowski, S. et al., "System and Method for Charachterizing a Clutch," U.S. Appl. No. 16/794,675, filed Feb. 19, 2020, 43 pages.
Nahrwold, T. et al., "Systems and Method for Adjusting Vehicle Performance," U.S. Appl. No. 16/794,783, filed Feb. 19, 2020, 34 pages.
Engerman, E., "Electric Drive Axle System With Multi-Speed Gear Train," U.S. Appl. No. 16/794,632, filed Feb. 19, 2020, 37 pages.
Engerman, E., "Electric Drive Axle With Lubrication System," U.S. Appl. No. 16/795,280, filed Feb. 19, 2020, 47 pages.

* cited by examiner

VEHICLE SYSTEM WITH MULTIPLE ELECTRIC DRIVE AXLES

FIELD

The present description relates generally to electric drive axles in vehicles, and more particularly to a vehicle system including multiple electric drive axles.

BACKGROUND

Electrified axles have been incorporated into electric as well as hybrid vehicles to generate and/or augment vehicle propulsion. Drive axles have been provided in both the front and rear of the vehicles. For example, in certain vehicle designs, one drive axle receives rotational energy from an engine and another drive axle receives rotational energy from an electric motor. Other axles system have utilized electric motors coupled to each drive wheel to provide four wheel drive operation.

However, the inventors have recognized that using multiple electrified axles (e.g., a front and rear electric drive axle) in a vehicle may present challenges with regard to manufacturing costs, vehicle handling, axle structural integrity, as well as drive axle control. For example, providing a drivetrain with a separate electric motor for each drive wheel may significantly increase the drivetrain's manufacturing costs. The inventors have also recognized that cost reductions may be achieved by using similar components in multiple vehicle drive axles. However, vehicle packaging may, in certain cases, impede an identical electrified axle housing from being used in both the front and rear of the vehicle. Furthermore, packaging constraints may lead to the re-orientation of the front and rear drive axles, in some instances, presenting motor control issues with regard to coordinated control of the different motors in the drivetrain.

SUMMARY

To overcome at least some of the aforementioned drawbacks, a vehicle system is provided. In one example, the vehicle system includes a first electric drive axle assembly with a first gear train having a first planetary gear set axially offset from a first electric motor-generator, where the first planetary gear set is rotationally coupled to a first differential. Further, the vehicle system has a second axle assembly with a second gear train having a second planetary gear set axially offset from a second electric motor-generator, where the second planetary gear set is rotationally coupled to a second differential. Arranging the gears in this manner allows the first and second electric drive axle assemblies to achieve a space efficient arrangement. Consequently, the axles may be less susceptible to damage from road debris, obstacles, etc.

In another example, the first gear train may include multiple selectable gear sets rotationally coupled to the first planetary gear set and the second gear train includes multiple selectable gear sets rotationally coupled to the second planetary gear set. At least a portion of the gears in the selectable gears sets in the first gear train may have a substantially equivalent size in relation to corresponding gears in the second gear train. Using similar gear sizes in each of the drive axles allows the manufacturing cost of the drive axle system to be reduced.

In yet another example, the first and second drive axle assemblies may be oriented such that the first and second planetary gear sets are positioned inboard or outboard from the first and second electric motor-generators, correspondingly. In this example, the electric motor-generators may be controlled to rotate in opposite directions during forward or reverse drive. In this way, front-rear motor control is coordinated to implement forward or reverse vehicle drive modes.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIGS. 2-8 are shown approximately to scale. However, other relative dimensions may be used, in other embodiments.

DETAILED DESCRIPTION

A vehicle system with two electric drive axles is described herein. Different features of the vehicle system allow the system to achieve a compact design which may be less expensive to manufacture than previous electrified axles. To elaborate, in one example, the orientation of a front electric drive axle relative to a rear electric drive axle may be selected to allow substantially equivalent gears in the drive axles to be used while also meeting packaging constraints in the vehicle. For instance, planetary gear sets in each of the axles may be positioned inboard or outboard in relation to the electric motor-generators. In one example, the front axle housing may mirror the rear axle housing but the direction of motor rotation in the front and rear electric motors may be equivalent during forward or reverse drive. In this way, the electric motors can run in the same direction so the drive and coast flanks of the gears can be improved for forward drive, regeneration, and reverse modes. However, in such an example, in production, the front and rear axle constituents may need separate part numbers and/or identifying markers. In another example, the front axle housing and the rear axle housing may have a similar geometric profile but the electric motors in each axle may be positioned inboard or outboard with regard to a central section of the vehicle. In such an example, the direction of motor rotation in the front and rear electric motors may be opposite one another, during forward or reverse drive. In this way, motor control may be coordinated to enable forward and reverse drive operation and allow the housing of each axle to have an equivalent geometry to reduce system manufacturing costs.

Figure 1:
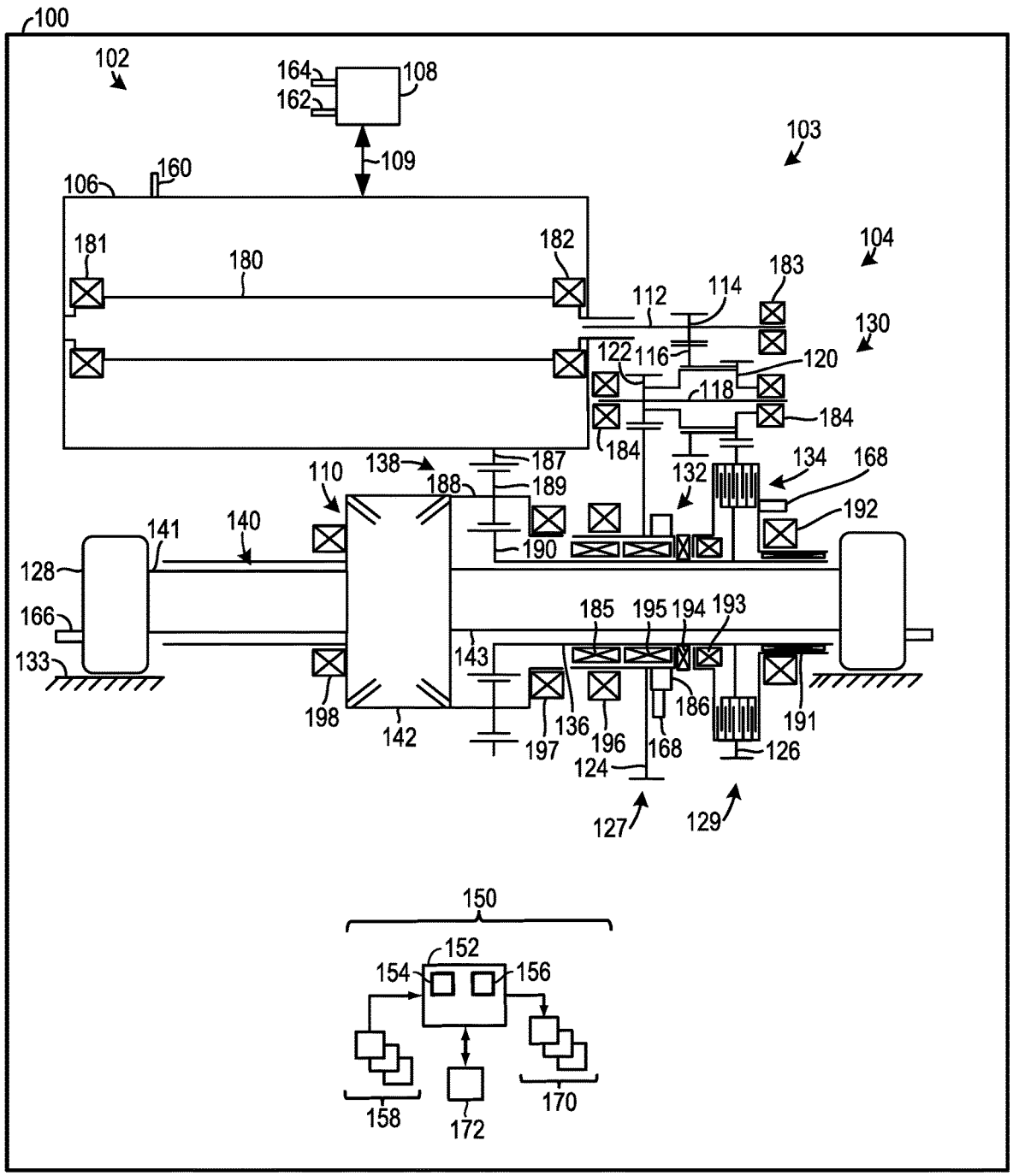
FIG. 1 is a schematic representation of a vehicle including a vehicle system.
Figure 2:
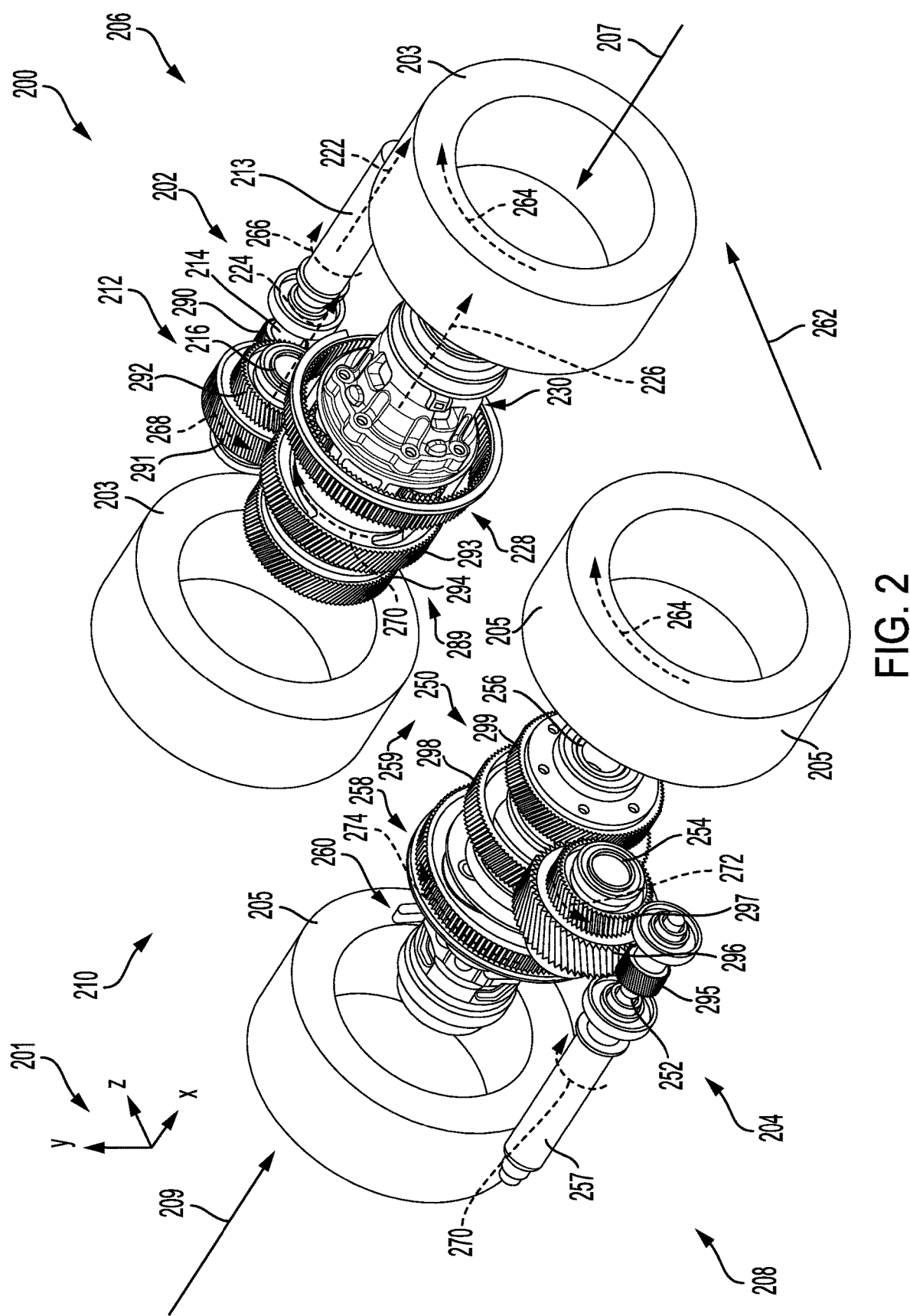
FIG. 2 shows a perspective view of an example of a vehicle system including multiple electric drive axle assemblies.
Figure 7:
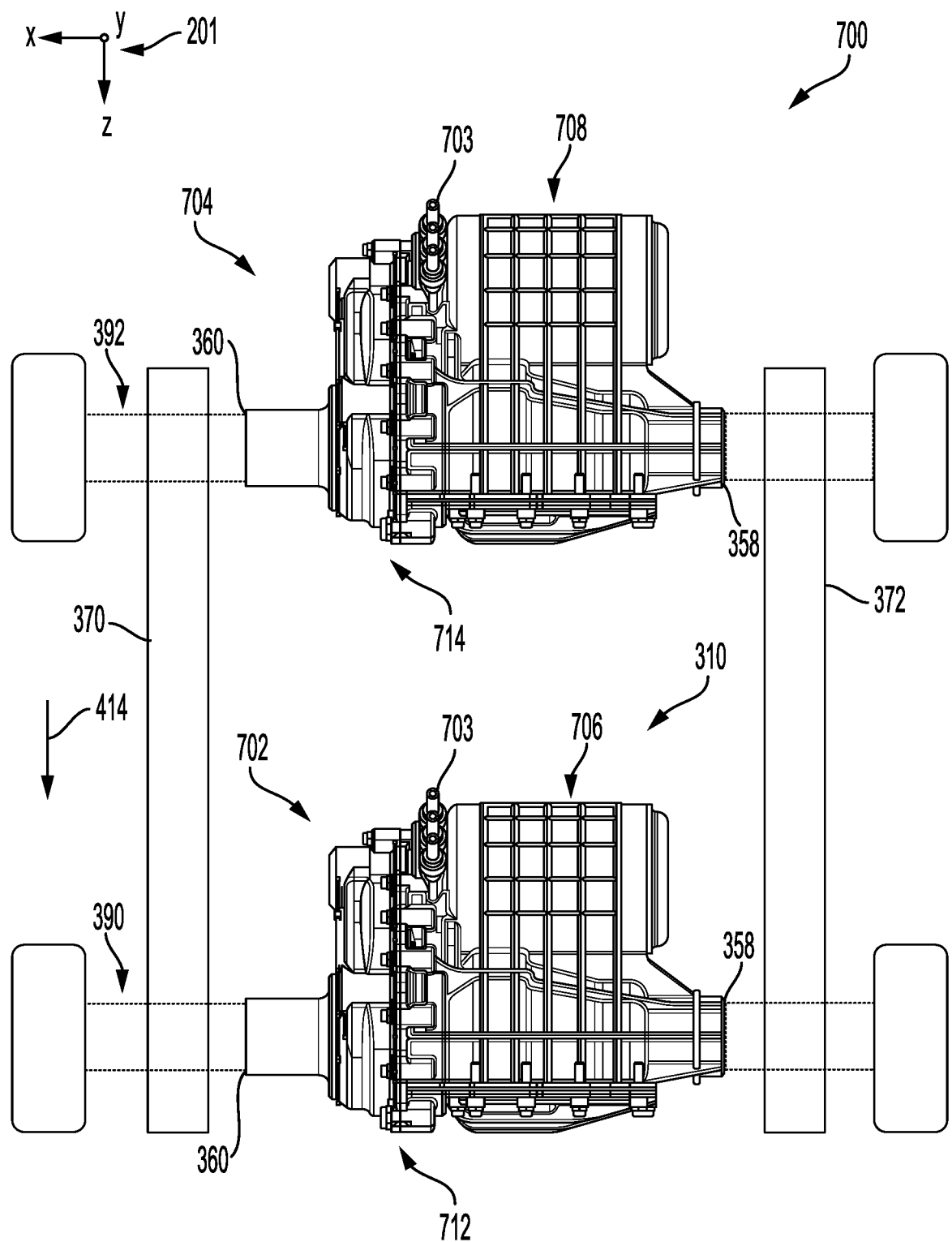
FIG. 7 shows a top-down view of a fifth arrangement of the front and rear electric drive axle assemblies.
Figure 8:
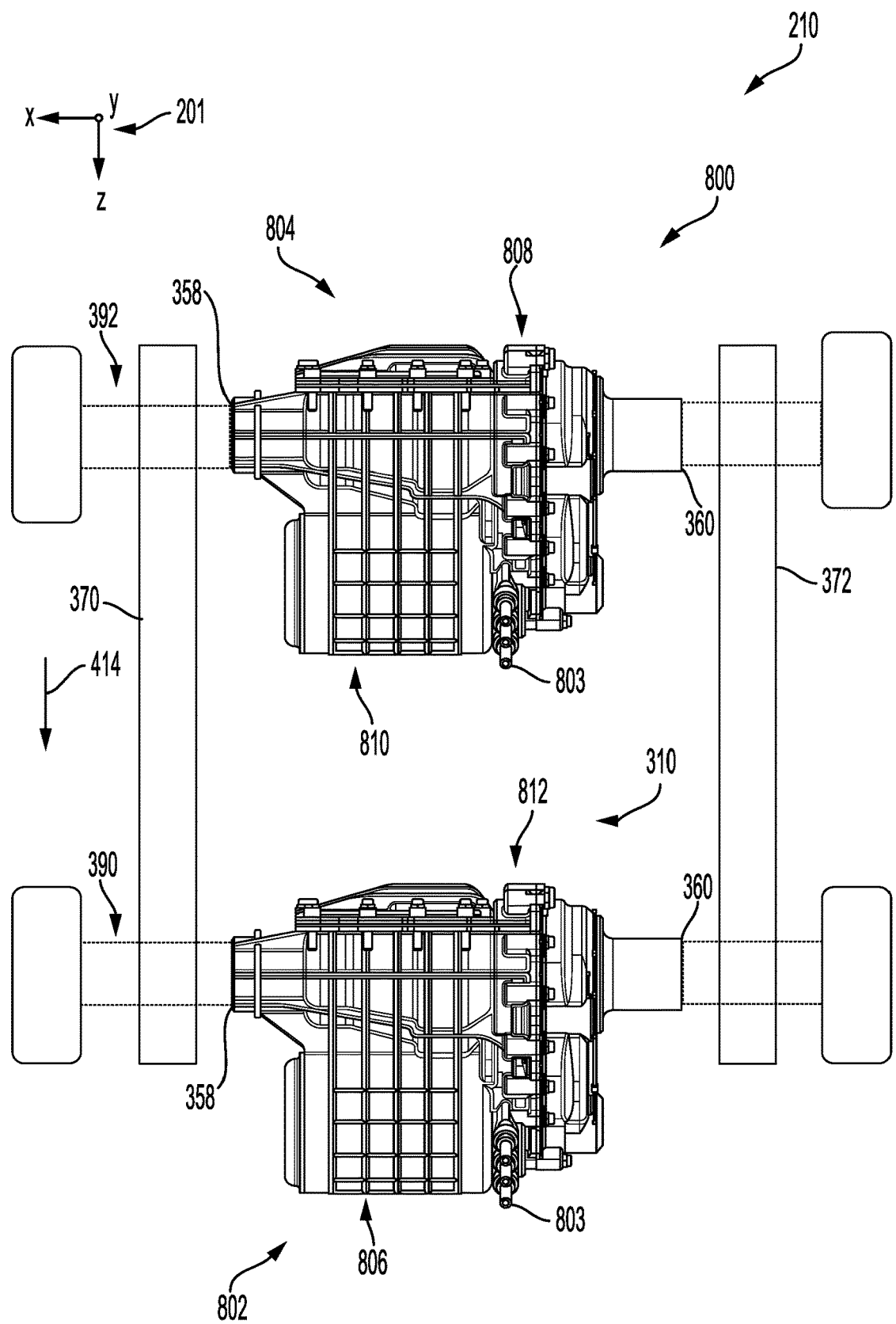
FIG. 8 shows a top-down view of a sixth arrangement of the front and rear electric drive axle assemblies.
Figure 9:
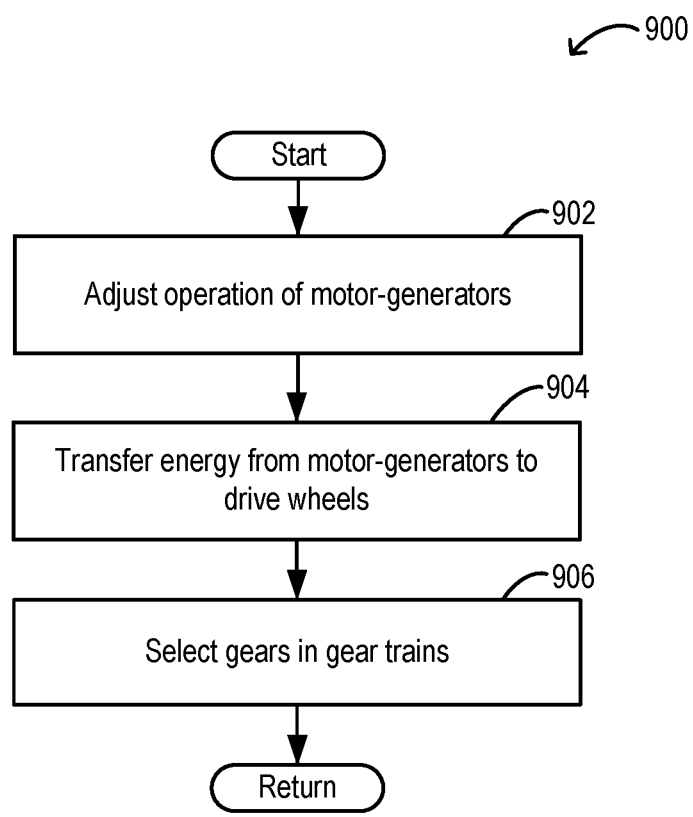
FIG. 9 shows an example of a routine for operating a vehicle equipped with electric drive axle assemblies which may be any of the arrangements of FIGS. 3-8.

FIG. 1 schematically illustrates a vehicle with a vehicle system designed with multiple gear ratios. An example of the vehicle system, including a front axle assembly and a rear axle assembly, is shown in FIG. 2 from a perspective view. Various orientations of the front and rear axle assemblies are illustrated in FIGS. 3-8. An example of a routine for operating the electric drive axle assemblies which may be implemented in the vehicle is depicted in FIG. 9.

FIG. 1 shows a schematic depiction of a vehicle 100 having a vehicle system 102 with an electric drive axle assembly 103 including a gear train 104 and an electric motor-generator 106. The stick diagram of FIG. 1 provides a high-level topology of the vehicle, gear train, and corresponding components. However, it will be understood that the vehicle, gear train, and corresponding components have greater structural complexity than is captured in FIG. 1. The structural details of various facets of the vehicle system 102 are illustrated, by way of example, in greater detail herein with regard to FIGS. 2-8.

The electric motor-generator 106 is electrically coupled to an energy storage device 108 (e.g., battery, capacitor, and the like). Arrows 109 signify the energy transfer between the electric motor-generator 106 and the energy storage device 108 that may occur during different modes of system operation. The electric motor-generator 106 may include conventional components for generating rotational output (e.g., forward and reverse drive rotational output) and/or electrical energy for recharging the energy storage device 108 such as a rotor electromagnetically interacting with a stator, to provide the aforementioned energy transfer functionality. The electric motor-generator 106 is shown including a rotor shaft 180 with a first bearing 181 and a second bearing 182 coupled thereto. The first bearing 181 may be a fixed bearing and the second bearing 182 may be a floating bearing. Although the second bearing 182 is shown positioned within the motor-generator, it will be understood that in some embodiments, bearing 182 may be coupled to the input shaft to facilitate rotation thereof. Other bearing arrangements with regard to the motor-generator have been contemplated such as arrangements with alternate quantities and/or types of bearings.

The vehicle may take a variety of forms in different embodiments. For example, the vehicle 100 may be hybrid vehicle where both the electric motor-generator 106 and an internal combustion engine (not shown) are utilized for motive power generation. For instance, in one use-case hybrid vehicle configuration, the internal combustion engine may assist in recharging the energy storage device 108, during certain conditions. In another use-case hybrid vehicle configuration, the internal combustion engine may be configured to provide rotational energy to a differential 110 or other suitable locations in the gear train 104. Further, in other examples, the vehicle may be a battery electric vehicle (BEV) where the internal combustion engine is omitted.

The rotor shaft 180 of the electric motor-generator 106 is coupled to an input shaft 112. For instance, the rotor shaft 180 may be transition fit, slip fit, mechanically attached, in splined engagement, combinations thereof, etc., with an end of the input shaft 112. A first gear 114 is positioned or formed on the input shaft 112. A bearing 183 is shown coupled to the input shaft 112. The bearing 183 may be a fixed bearing, in one example. However, in other examples, the bearing 183 may be another suitable type of bearing or in some cases may be omitted from the system.

A second gear 116 is rotationally coupled to the first gear 114 and resides on an intermediate shaft 118. As described herein, rotational coupling between gears or other components may include an interface between the gears where teeth of the gears mesh to facilitate rotational energy transfer therebetween. As such, rotational coupling of the components allows rotational energy transfer to be transferred between the corresponding components. Conversely, rotational decoupling may include a state between two components when rotational energy is substantially inhibited from being transferred between the components.

A third gear 120 and a fourth gear 122 are additionally included on the intermediate shaft 118, although other gearing arrangements have been envisioned. Bearings 184 (e.g., tapered roller bearings) are coupled to either axial end of the intermediate shaft 118 to support the shaft and facilitate rotation thereof. The tapered roller bearings may decrease the axle package width when compared to other types of bearing such as ball bearings. However, other suitable intermediate shaft bearing types and/or arrangements have been envisioned. The bearing arrangement on the intermediate shaft as well as the other bearing arrangements described herein may be selected based on expected shaft loading (e.g., radial and thrust loading), gear size, shaft size, etc.

Continuing with the gear train description, the fourth gear 122 is rotationally coupled to a fifth gear 124 and the third gear 120 is rotationally coupled to a sixth gear 126. The first gear 114, the second gear 116, the third gear 120, the fourth gear 122, the fifth gear 124, and the sixth gear 126 are included in a gear assembly 130, in the illustrated embodiment. However, the gear assembly may include an alternate number of gears and/or have a different layout, in other embodiments. The number of gears in the assembly and the assembly layout may be selected based on end-use design goals related to desired gear range and packaging, for instance.

The first gear 114, the second gear 116, the fourth gear 122, and the fifth gear 124, may be included in a first gear set 127. Additionally, the first gear 114, the second gear 116, third gear 120, and the sixth gear 126, may be included in a second gear set 129. The first gear set 127 may have a higher gear ratio than the second gear set 129, in one example. However, other gear arrangements in the different gear sets may be used, in other examples. Clutch assemblies in the system 102 allow the first gear set 127 or the second gear set 129 to be placed in an operational state. To elaborate, the clutch assemblies allow the gear ratio delivered to drive wheels 128 on driving surfaces 133, by way of the gear assembly 130, a planetary gear assembly 138, and the differential 110, to be adjusted. For instance, the clutch assemblies may be operated to engage the first gear set 127, during certain conditions (e.g., towing, lower speed vehicle operation, etc.), and engage the second gear set 129, during other conditions (e.g., higher speed vehicle operation). As such, the system may transition between the different gear sets based on vehicle operating conditions, driver input, etc. In this way, the gear train has distinct selectable gear ratios, allowing the gear train to be adapted for different driving conditions, as desired. It will be appreciated that the gear ratio adjustability may also be utilized to increase electric motor efficiency, in some cases.

The system 102 may specifically include a first clutch assembly 132 and a second clutch assembly 134. The first clutch assembly 132 is configured to rotationally couple and decouple the fifth gear 124 from an output shaft 136. Likewise, the second clutch assembly 134 functions to rotationally couple and decouple the sixth gear 126 from the output shaft 136. The first clutch assembly 132 may include a one-way clutch 185 (e.g., sprag clutch) and a locking clutch 186 working in conjunction to accomplish the coupling/decoupling functionality, in a compact arrangement. However, other clutch designs have been contemplated, such as a friction clutch (e.g., wet friction clutch), a hydraulic clutch, an electromagnetic clutch, and the like.

The one-way clutch 185 may be designed to transfer rotational energy from the fifth gear 124 to the output shaft 136 when the fifth gear is rotating in the forward drive direction and the rotational speed exceeds that speed of the output shaft. Conversely, when the fifth gear is rotating in the reverse drive direction of the output shaft speed is greater than the fifth gear speed, the one-way clutch freewheels, allowing the fifth gear and the output shaft to be rotationally decoupled. Furthermore, the locking clutch 186 may be configured to rotationally couple and decouple the fifth gear from the output shaft. For instance, the locking clutch may be activated during a reverse drive mode or during a regeneration mode.

The second clutch assembly 134 may be a wet friction clutch providing smooth engagement/disengagement between the sixth gear 126 and the output shaft 136, in one embodiment. However, in other examples, the second clutch assembly 134 may include additional or alternate types of suitable clutches (e.g., hydraulic, electromagnetic, etc.).

The output shaft 136 is rotationally coupled to the planetary gear assembly 138, in the illustrated embodiment. The planetary gear assembly 138 may include an annulus 187 also referred to as a ring gear, a carrier 188 with planet gears 189 mounted thereon, and a sun gear 190 providing a space efficient design capable of providing a relatively high gear ratio in comparison to non-planetary arrangements. However, non-planetary gear layouts may be used in the system, in certain embodiments, when for example, space efficient packaging is less favored. In the illustrated embodiment, the sun gear 190 is rotationally coupled to the output shaft 136 and the carrier 188 is rotationally coupled to the differential 110 (e.g., a differential case). However, in alternate examples, different gears in the planetary assembly may be rotationally coupled to the output shaft and the differential. Further, in one example, the components of the planetary gear assembly 138 may be non-adjustable with regard to the components that are held stationary and allowed to rotate. Thus, in one-use case example, the annulus 187 may be held substantially stationary and the carrier 188, planet gears 189, and the sun gear 190 and the gears stationary/rotational state may remain unchanged during gear train operation. In the illustrated embodiment, the annulus 187 is fixedly coupled to the motor-generator housing, to increase system space efficiency. However, the annulus may be fixedly coupled to other vehicle structures, in other instances. By using a non-adjustable planetary assembly, gear train operation may be simplified when compared to planetary arrangements with gears having rotational state adjustability. However, adjustable planetary arrangements may be used in the system, in other embodiments.

Various bearings may be coupled to the output shaft 136 and the planetary gear assembly 138 to enable rotation of components coupled to the shaft and assembly and in some cases support the components with regard to radial and/or thrust loads. A bearing 191 (e.g., needle roller bearing) is shown coupled to the output shaft 136 and the second clutch assembly 134. Additionally, a bearing 192 (e.g., tapered roller bearing) is shown coupled to the second clutch assembly 134. A bearing 193 (e.g., floating bearing) is also shown coupled to the second clutch assembly 134 and the output shaft 136. A bearing 194 (e.g., thrust bearing) may also be positioned axially between and coupled to the sixth gear 126 and the first clutch assembly 132. A bearing 196 (e.g., fixed bearing) may also be coupled to the one-way clutch 185. Additionally, a bearing 197 (e.g., ball bearing) is shown coupled to the planetary gear assembly 138 and a bearing 198 (e.g., ball bearing) is shown coupled to the differential case 142. However, other suitable bearing arrangements have been contemplated, such as arrangements where the quantity and/or configurations of the bearings are varied.

Additionally, FIG. 1 depicts the planetary gear assembly 138 directly rotationally coupled to the differential 110. Directly coupling the planetary gear assembly to the differential increases system compactness and simplifies system architecture. In other examples, however, intermediate gearing may be provided between the planetary gear assembly and the differential. In turn, the differential 110 is designed to rotationally drive an axle 140 coupled to the drive wheels 128. The axle 140 is shown including a first shaft section 141 and a second shaft section 143 coupled to different drive wheels 128. Furthermore, the axle 140 is shown arranged within (e.g., co-axial with) the output shaft 136 which allows more space efficient design to be achieved. However, offset axle-output shaft arrangements may be used, in other examples.

Further in one example, the axle 140 may be a beam axle. A beam axle, also referred to in the art as a solid axle or rigid axle, may be an axle with mechanical components structurally supporting one another and extending between drive wheels coupled to the axle. Thus, wheels coupled to the axle may move in unison when articulating, during, for example, vehicle travel on uneven road surfaces. For instance, the beam axle may be a structurally continuous axle spanning the drive wheels on a lateral axis, in one embodiment. In another embodiment, the beam axle may include co-axial shafts receiving rotational input from different gears in the differential and structurally supported by the differential.

The differential 110 may include a case 142 housing gearing such as pinion gears, side gears, etc., to achieve the aforementioned energy transfer functionality. To elaborate, the differential 110 may be an electronic locking differential, in one example. In another example, the differential 110 may be an electronic limited slip differential or a torque vectoring dual clutch. In yet other examples, an open differential may be used. Referring to the locking differential example, when unlocked, the locking differential may allow the two drive wheels to spin at different speeds and conversely, when locked, the locking differential may force the drive wheels to rotate at the same speed. In this way, the gear train configuration can be adapted to increase traction, under certain driving conditions. In the case of the limited slip differential, the differential allows the deviation of the speed between shafts 144 coupled to the drive wheels 128 to be constrained. Consequently, traction under certain road conditions (e.g., low traction conditions such as icy conditions, wet conditions, muddy conditions, etc.) may be increased due to the wheel speed deviation constraint. Additionally, in the torque vectoring dual clutch example, the differential may allow for torque delivered to the drive wheels to be independently and more granularly adjusted to again increase traction during certain driving conditions. The torque vectoring dual clutch may therefore provide greater wheel speed/torque control but may, in some cases, be more complex than the locking or limited slip differentials.

The vehicle 100 may also include a control system 150 with a controller 152. In some examples, as described herein with reference to FIGS. 3-9, the vehicle system 102 may include more than one electric drive axle assembly. As such, the electric drive axle assembly 103 including the gear train 104, electric motor-generator 106, etc., may be a rear electric drive axle assembly, in one use-case. In such a use-case, a similar electric drive axle assembly may be provided at the front axle which includes a similar gear train, electric motor-generator, etc. Thus, in some embodiments, the front and rear electric drive axle assemblies may each include gear trains with similar gear ratios and clutches enabling gear ratio selection functionality. Both the first and second electric drive axle assemblies may be controlled by the control system 150 and controller 152. In addition, in some examples, the motor-generator of each drive axle may be coupled to the energy storage device 108. In other examples, each motor-generator may be coupled to an individual energy storage device.

The controller 152 includes a processor 154 and memory 156. The memory 156 may hold instructions stored therein that when executed by the processor cause the controller 152 to perform the various methods, control techniques, etc., described herein. The processor 154 may include a microprocessor unit and/or other types of circuits. The memory 156 may include known data storage mediums such as random access memory, read only memory, keep alive memory, combinations thereof, etc. Furthermore, it will also be understood that the memory 156 may include non-transitory memory.

The controller 152 may receive various signals from sensors 158 coupled to various locations in the vehicle 100 and the vehicle system 102. The sensors may include a motor-generator speed sensor 160, an energy storage device temperature sensor 162, an energy storage device state of charge sensor 164, wheel speed sensors 166, clutch position sensors 168, etc. The controller 152 may also send control signals to various actuators 170 coupled at different locations in the vehicle 100 and the vehicle system 102. For instance, the controller 152 may send signals to the electric motor-generator 106 and the energy storage device 108 to adjust the rotational speed and/or direction (e.g., forward drive rotational direction and reverse drive rotational direction) of the motor-generator. The controller 152 may also send signals to the first clutch assembly 132 and the second clutch assembly 134 to adjust the operational gear ratio in the gear train 104. For instance, the first clutch assembly 132 may be disengaged and the second clutch assembly 134 may be engaged to place the second gear set 129 in an operational state (transferring rotational energy between the electric motor-generator 106 and the output shaft 136). The other controllable components in the vehicle and gear system may function in a similar manner with regard to command signals and actuator adjustment. For instance, the differential 110 may receive command signals from the controller 152.

The vehicle 100 may also include an input device 172 (e.g., a gear selector such as a gear stick, gear lever, etc., console instrument panel, touch interface, touch panel, keyboard, combinations thereof, etc.) The input device 172, responsive to driver input, may generate a mode request indicating a desired operating mode for the gear train. For instance, in a use-case example, the driver may shift a gear selector into a gear mode (e.g., first gear mode or second gear mode) to generate a gear set modal transition request at the controller. In response, the controller commands gear train components (e.g., the first clutch assembly 132 and the second clutch assembly 134) to initiate a transition into a first gear mode, where the first gear set 127 is operational, from a second gear mode, where the second gear set 129 is operational, or vice versa. The controller 152 may also be configured to transition the vehicle system 102 into a regenerative mode. In the regenerative mode energy is extracted from the gear train using the electric motor-generator 106 and transferred to the energy storage device 108. For instance, the electric motor-generator 106 may be placed in a generator mode configured to convert at least a portion of the rotational energy transferred from the drive wheels to the generator by way of the gear train into electrical energy. It will be appreciated that the other electric drive axle assembly included in the vehicle may be operated in similar modalities, in some embodiments.

FIG. 2 shows a vehicle system 200 of a vehicle 210. It will be appreciated that the vehicle system 200, shown in FIG. 2, serves as an example of the vehicle system 102 shown in FIG. 1. As such, at least a portion of the functional and structural features of the vehicle system 102 shown in FIG. 1 may be embodied in the vehicle system 200 shown in FIG. 2 or vice versa, in certain embodiments.

The vehicle system 200 includes a first electric drive axle assembly 202 and a second electric drive axle assembly 204. A set of reference axes 201 are provided for reference in FIGS. 2-8, indicating a y-axis, an x-axis, and a z-axis. The z-axis may be a longitudinal axis, the x-axis may be a lateral axis, and/or the y-axis may be a vertical axis, in one example. However, the axes may have other orientations, in other examples.

As one example, the first electric drive axle assembly 202 may be a front electric drive axle of the vehicle 210 and the second electric drive axle assembly 204 may be a rear electric drive axle of the vehicle 210. In one example, the front axle may be a beam axle coupled to front drive wheels 203 of the vehicle 210 and the rear axle may also be a beam axle coupled to rear drive wheels 205 of the vehicle 210. Therefore, in such an example, the front electric drive axle assembly 202 may be arranged proximate to a front end 206 of the vehicle 210 and the rear electric drive axle assembly 204 may be arranged proximate to a rear end 208 of the vehicle 210.

Components of the front electric drive axle assembly 202 will now be described. It will be appreciated that, although positioned in a different orientation, the rear electric drive axle assembly 204 may be similarly configured to the front electric drive axle assembly 202, with regard to internal componentry such as gearing, clutches, electric motor generators, etc.) and as such, description of the components of the front electric drive axle assembly 202 may be applicable to components of the rear electric drive axle assembly 204. Details of the relative orientations of the front electric drive axle assembly 202 and the rear electric drive axle assembly 204 are provided further below with reference to FIGS. 3-8.

The front electric drive axle assembly 202 includes a first electric motor-generator with a rotor shaft 213 connected to a first input shaft 214. The first electric motor-generator is omitted in FIG. 2 for but depicted in FIGS. 3-8. It will be appreciated that other suitable electrical interfaces other than the electrical interface shown in FIGS. 3-8 may be used, in other examples. The first motor-generator may be coupled to a first gear train 212 which may include the first input shaft 214, a first intermediate shaft 216, and a first output shaft, obscured from view in FIG. 2.

The first input shaft 214 receives rotational input (forward or reverse drive rotation) from the rotor shaft 213 of the first electric motor-generator, while the system is operating in forward and reverse drive modes. The first input shaft 214 is rotationally coupled to the first intermediate shaft 216 and the first output shaft by way of the first gear train 212. Rotational axes 222, 224, and 226 of the first input shaft 214, the first intermediate shaft 216, and the first output shaft, respectively, are provided for reference in FIG. 2. FIG. 2 additionally shows a first planetary gear assembly 228 rotationally coupled to a first differential 230 in the first gear train 212. It will be appreciated that placing the first planetary gear assembly 228 next to the first differential 224 allows less torque to be carried through the first gear train 212, enabling the drive train to have fewer and/or smaller components, if wanted.

The first planetary gear assembly 228 can achieve a targeted gear ratio (e.g., a relatively high gear ratio, such as a ratio greater than 20:1, in one use-case) in a compact arrangement relative to non-planetary gear arrangements. Thus, the planetary gear assembly can achieve a desired gear ratio with less components (e.g., gears and shafts) than non-planetary gear assemblies, if desired. Furthermore, in embodiments where the planetary gear assembly exhibits a relatively high torque output, the planetary assembly can attain a more compact packaging due to the load sharing between the planet gears, if desired.

The first gear train 212 includes a gear assembly 289 that may include six gears (a first gear 290, a second gear 291, a third gear (obscured from view), a fourth gear 292, a fifth gear 293, and a sixth gear 294), where the second, third, and fourth gears are coupled to the first intermediate shaft 216, as described above with regard to FIG. 1. The fifth and sixth gears are coupled to the first output shaft. It will be understood, that during different modes of system operation different sets of gears may be operational. The first, second, fourth, and fifth gears may be included in a first gear set and the first gear, second, third, and sixth gears may be included in a second gear set, as described above for FIG. 1. A park gear may also be included in the first gear train 212, in some examples. However, the gear sets may include different gear combinations, in other examples.

It will also be understood that the first and the second gear sets have different gear ratios. In this way, the gear train may include multiple gear ratios to increase gear train adaptability. Additionally, the gear sets may share a few common gears (i.e., the first and second gears in the illustrated embodiment). Fixing the first ratio (i.e., the first and second gears) in the gear train can allow the accuracy of the gears to be increased, if wanted, thereby reducing noise, vibration, and harshness (NVH) in the system. However, embodiments where the gear sets do not include overlapping gears have been envisioned. Clutch assemblies, which may be similar to the clutch assemblies 132 and 134 shown in FIG. 1, are included in the first gear train 212 to enable the first gear set and the second gear set to be coupled/decoupled to/from the first output shaft. In this way, the different gear sets may be operationally selected to, for example, more aptly suite the driving environment and/or increase electric motor efficiency. Thus, the first and second gear sets may be conceptually included in a selectable gear assembly.

The first planetary gear assembly 228 is rotationally coupled to the first output shaft and the first differential 230 in the first gear train 212 is rotationally coupled to the first planetary gear assembly 228. However, other gear layouts may be used in other examples, such as non-planetary gear assemblies, gear trains with gears positioned between the planetary assembly and the differential, etc. The first planetary gear assembly 228 allows a desired gear ratio to be realized in a compact arrangement. For instance, the first planetary gear assembly 228 may achieve a relatively high gear ratio and space efficiency, if desired. However, non-planetary gear arrangements may be used, in other examples.

Furthermore, the first planetary gear assembly 228 and the first differential 230 are shown positioned on a lateral side relative to the first motor-generator (e.g., where the first motor-generator is coupled to the first input shaft 214 and centered about the rotational axis 222 of the first input shaft 214). In other words, the first planetary gear assembly 228 and the first differential 230 are positioned on lateral side of the first motor-generator along the z-axis. More specifically, the first planetary gear assembly 228 and the first differential 230 are axially offset from the rotor shaft 313 of the first motor-generator. Therefore, the rotational axis 222 of the rotor shaft 213 is not co-axial with the rotational axis 226 of the output shaft, the first planetary gear assembly 228, and the first differential 230. It will be appreciated that the first planetary gear assembly 228 may be axially offset from the first motor-generator due to the planetary gear assembly's ability to be integrated into the gear train without a mating gear parallel thereto, if wanted. In this way, the planetary gear assembly may be placed in a space which has remained unused in certain electrified gearboxes. Thus, positioning the planetary gear assembly on the side of the motor allows the compactness of the axle system to be increased. As a result, the packaging constraints arising during axle installation in the vehicle may pose less of an issue. However, in other examples, the first planetary gear assembly 228 may be positioned in other suitable locations.

As described above, the vehicle system 200 includes two electric drive axle assemblies. In the illustrated embodiment, each electric drive axle assembly has substantially similar gear components (e.g., gear shafts, gears, and/or clutches). To elaborate, the gears in the front electric drive axle assembly 202 and the second electric drive axle assembly 204 may include individual gears in their respective gear trains that are substantially equivalent in size and/or profile. For instance, equivalent gears may have a similar inner diameter, outer diameter, width, and/or tooth pattern. Thus, the gears may be jointly manufactured to allow for reductions in vehicle manufacturing costs. However, in other examples, only a portion of the gears and/or other components in each drive axle may have a substantially equivalent size and/or profile.

Therefore, as shown in FIG. 2, the rear electric drive axle assembly 204 also includes a second gear train 250, a second input shaft 252, a second intermediate shaft 254 and a second output shaft 256. A second motor-generator with a rotor shaft 257 may be connected to the second input shaft 252. The second motor-generator may be axially (e.g., along the x-axis) offset from a second planetary gear assembly 258 and a second differential 260 of the second gear train 250. Furthermore, the gears in the second gear train 250 are shown including six gears (a first gear 295, a second gear 296, a third gear 297, a fourth gear (obscured from view), a fifth gear 298, and a sixth gear 299). However, as mentioned above, the gear trains may have an alternate number of gears, in other embodiments.

Components of the rear electric drive axle assembly 204 may be oriented in a similar, or equivalent, arrangement relative to one another as the front electric drive axle assembly 202. However, relative to the front end 206 and rear end 208 of the vehicle 210, the rear electric drive axle assembly 204 and the front electric drive axle assembly 202 may each be positioned such that their respective motor generator rotor shafts (213 and 257) are positioned outboard with regard to a central vehicle region 259. Thus, in such an example, the orientations of the rear electric drive axle assembly 204 and the front electric drive axle assembly 202, shown in FIG. 2, are rotated 180° about the y-axis with regard to one another. Although, the vehicle 210 is shown in an arrangement where the rotor shafts are positioned in an outboard location, it will be appreciated that the front and rear electric drive axle assemblies 202 and 204 may be positioned in different orientations, in other embodiments. FIGS. 3-8 depict different possible orientations of front and rear drive axles in the vehicle system 200 with the drive axle's componentry enclosed in outer housings. It will also be understood, that the vehicle system 200 and the other vehicle system arrangements described herein may be controlled by a suitable controller, such as the controller 152, shown in FIG. 1.

Figure 3:
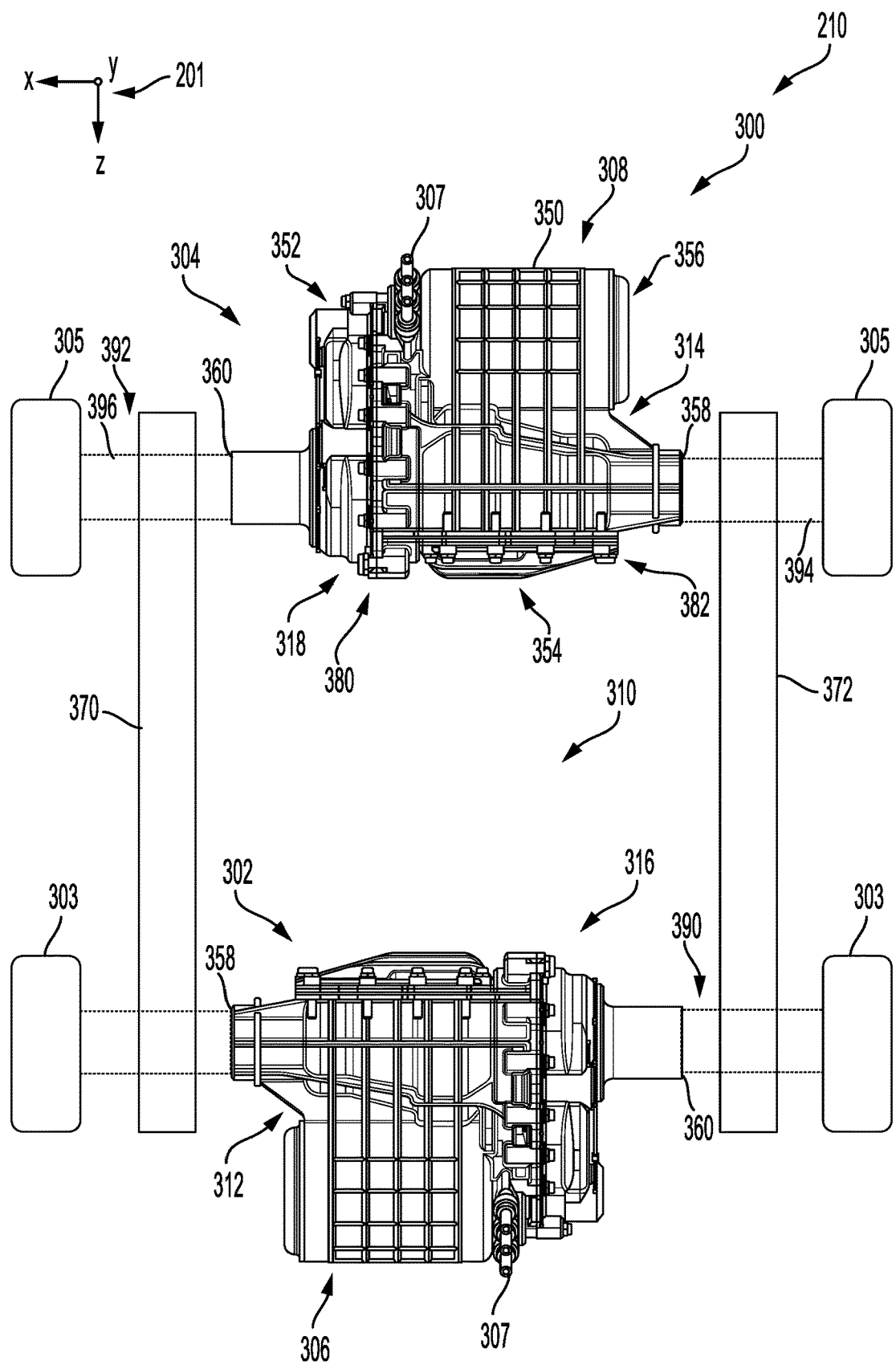
FIG. 3 shows a top-down view of a first arrangement of the front and rear electric drive axle assemblies.

FIG. 3 shows a first vehicle system arrangement 300. As shown in FIG. 3, the first vehicle system arrangement 300 includes a front electric drive axle assembly 302, providing torque to front drive wheels 303 of the vehicle 210, and a rear electric drive axle assembly 304, providing torque to rear drive wheels 305. As previously discussed, each electric drive axle assembly may include axles 390, 392 with axle shafts coupled to a differential and the drive wheels.

In the illustrated embodiment, the rear electric drive axle assembly 304 is rotated 180° about the y-axis relative to the front electric drive axle assembly 302 so that a first motor-generator 306 of the front electric drive axle assembly 302 and a second motor-generator 308 of the rear electric drive axle assembly 304 are positioned in an outboard configuration. In the outboard configuration of the first vehicle system arrangement 300, each of the first motor-generator 306 and the second motor-generator 308 are spaced away from a central region 310 of the vehicle 210. The central region 310, may be longitudinally bounded, in one example, by front and rear axles 390 and 392 extending between the front and rear drive wheels 303, 305, respectively.

The front electric drive axle assembly 302 is depicted with a first outer housing 312 and the rear electric drive axle assembly 304 is depicted with a second outer housing 314. The first and second outer housings 312, 314 may enclose the first and second motor-generators 306, 308 as well as a first gear train (e.g., the first gear train 212, shown in FIG. 2) and a second gear train (e.g., the second gear train 250, shown in FIG. 2), respectively. The first and second outer housings 312, 314 may be similarly configured and the following description of the outer housing is applicable to both.

Each of the first and second outer housings 312, 314 may include a first section 350, a second section 352, a third section 354, and a fourth section 356. It will be appreciated that each of the front and rear drive axle assemblies shown in FIGS. 4-8 include an outer housing having similar sections to the first and outer housing 312, 314, described for FIG. 3 and will not be re-introduced for brevity. However, the relative positions and orientations of the housing sections may vary between the different vehicle system arrangements, shown in FIGS. 4-8. Further, in some embodiments, the axle housings may have a mirrored profile from front to rear, as discussed in greater detail herein with regard to the vehicle system arrangements shown in FIGS. 5-6.

The sections of the outer housings may be configured to be removably coupled via fasteners, interference fitting, clamps, etc., to allow access to inner components of the vehicle system 200. To elaborate, the first section 350 may be coupled to the second section 352 at an attachment interface 380 and the third section 354 may be coupled to the first section 350 at an attachment interface 382. The first section 350 may at least partially enclose portions of the motor-generator, the differential (e.g., the first differential 230, shown in FIG. 2), and the gear train (e.g., the first gear train 212, shown in FIG. 2) of the axle assembly. The second section 352 may at least partially surround a portion of the gear train and, when coupled to the first section 350. Additionally, the third section 354 may at least partially enclose and provide access to the planetary gear assembly (e.g., the first planetary gear assembly 228, shown in FIG. 2) and the differential (e.g., the first differential 230, shown in FIG. 2).

The first section 350 of the outer housing may include a first shaft opening 358. It will be understood that a first section 394 of the rear axle 392 coupled to one of the rear drive wheels 305 (or one of the front drive wheels 303) of the vehicle 210 may extend through the first shaft opening 358. The second section 352 of the outer housing may include a second shaft opening 360. Again, a second section 396 of the rear axle 392, coupled to one of the rear drive wheels 305 (or one of the front drive wheels 303), may extend through the second shaft opening 360. Furthermore, it will be appreciated that the shaft openings in the axle housings may be arranged co-axial with the output shafts (e.g., output shaft 136, shown in FIG. 1) in the gear trains.

When assembled (e.g., all sections of the outer housing are coupled to one another) the outer housing provides an outer shell to the axle assembly and shields inner components of the axle assembly from contact with flying debris during vehicle navigation.

In the first vehicle system arrangement 300, the front and rear axle assemblies 302, 304 are in the outboard configuration, as described above. In this arrangement, the first shaft opening 358 of the first outer housing 312 is proximate to a first vehicle frame section 370 of the vehicle 210 (e.g., on the left side of FIG. 3), and the second shaft opening 360 of the first outer housing 312 is proximate to a second vehicle frame section 372 of the vehicle 210 (e.g., on the right side of FIG. 3). Thus, the first and second housings may be interchangeable and manufactured based on a single prototype, thereby decreasing manufacturing costs, if desired.

Each of the first and second motor-generators 306, 308 also includes an electrical interface 307 protruding upwards from the motor-generators, along the y-axis. The electrical interface 307 allows electrical cables to be connected to the motor-generators. Although the gear trains in the front and rear electric drive axle assemblies 302, 304 may be similarly configured (e.g., components of each gear train are similarly aligned and positioned relative to one another) a drive direction of the gear trains may be different. For example, as shown in FIG. 2, a forward direction of the vehicle 210 is indicated by arrow 262. Both the front drive wheels 203 and the rear drive wheels 205 rotate in a first direction, as indicated by arrows 264, to enable forward navigation of the vehicle 210. To facilitate the rotation of the front drive wheels 203 in the first direction for forward motion of the vehicle, the first input shaft 214 may be driven by the first motor-generator to rotate in a clockwise (cw) direction, as indicated by arrow 266, when viewing the front electric drive axle assembly 202 along arrow 207. The first intermediate shaft 216 may be driven by the first input shaft 214 to rotate in a counterclockwise (ccw) direction, as indicated by arrow 268. Rotation of the first intermediate shaft 216 in the ccw direction may, in turn, drive rotation of the first output shaft 218 in the cw direction, as indicated by arrow 270. As a result of the rotation of the first output shaft 218, the drive wheel 203 propel the vehicle 210 in the forward direction, indicated via arrow 262.

As shown in FIG. 2, at the rear axle of the vehicle 210, in a forward drive mode, components of the rear electric drive axle assembly 204 may be configured to rotate in opposite directions in relation to components of the front electric drive axle assembly 202 due to the rotated configuration of the front and rear electric drive axles. For example, when viewing the rear electric drive axle assembly 204 along arrow 209, the second input shaft 252 may be driven by the second motor-generator to rotate in the ccw direction, as indicated by arrow 270, the second intermediate shaft 254 may rotate in the cw direction, as indicated by arrow 272, and the second output shaft 256 may rotate in the ccw direction, as indicated by arrow 274. As a result of the rotation of the second output shaft 256, the drive wheel 205 propel the vehicle 210 in the forward direction, indicated via arrow 262.

As such, the first vehicle system arrangement 300, as shown in FIG. 3, the first motor-generator 306, and the second motor-generator 308 may generate opposite rotational outputs to achieve both forward and reverse motion of the vehicle 210. As such, a controller (e.g., the controller 152 of FIG. 1) may be configured with instructions specific to the arrangement of the vehicle system 200 to accommodate the relative orientations of the front and rear electric drive axle assemblies. Thus, when the vehicle system 200 is configured in the first vehicle system arrangement 300, the controller of the vehicle 210 may be adapted with executable instructions to operate the first motor-generator and the second motor-generator in opposite rotational directions to achieve forward and reverse vehicle drive modes. It will also be understood, that during regeneration modes in both the front and rear electric motor-generators the rotational input received by each motor-generator may be in an opposite rotational direction.

In the outboard orientation of the front and rear electric drive axle assemblies (e.g., where the first and second motor-generators are rotated away from the central region 310 of the vehicle 210) the arrangement of the motor-generators may allow vehicle components (e.g., battery banks, frame sections, etc.) to be efficiently located in the central region 310 with regard to space. Thus, by positioning the motor-generators away from the central region, motor-generator packaging may not interfere with the centrally located vehicle components. Furthermore, positioning the electrical interfaces 307 on upper sides of the motor-generators decreases their exposure to road debris, stationary objects, etc., decreasing the chance of damage to the electrical interfaces during vehicle operation.

Figure 4:
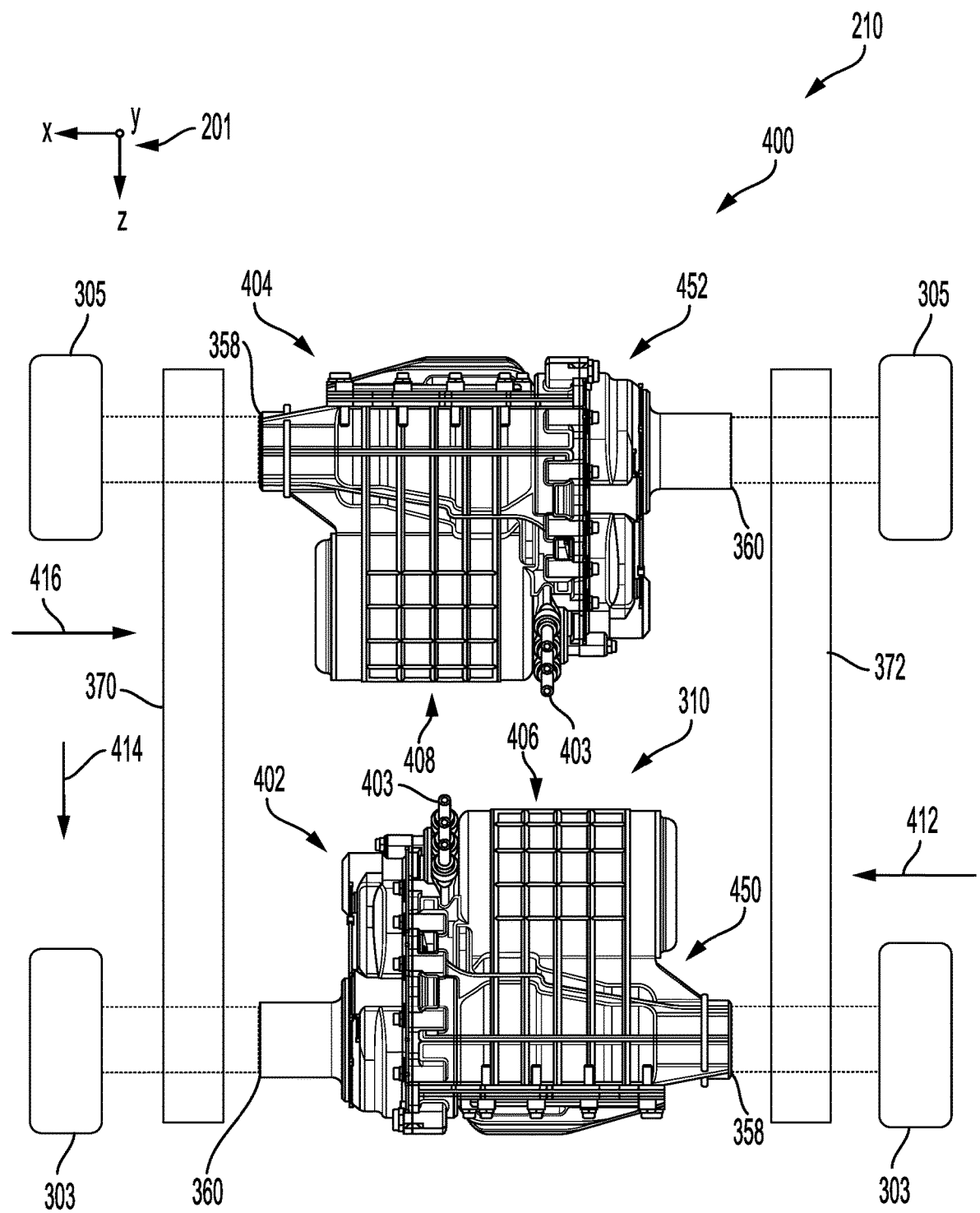
FIG. 4 shows a top-down view of a second arrangement of the front and rear electric drive axle assemblies.

In other instances, when space is available in the central region 310 of the vehicle 210, the motor-generators may be rotated inwards in an inboard configuration. For example, as shown in FIG. 4, a front electric drive axle assembly 402 and a rear electric drive axle assembly 404 may oriented such that they are rotated 180° about the y-axis in relation to one another in a second vehicle system arrangement 400. In the second vehicle system arrangement 400, a first motor-generator 406 of the front electric drive axle assembly 402 and a second motor-generator 408 of the rear electric drive axle assembly 404 are positioned in an inboard configuration where the first and second motor-generators 406, 408 are in the central vehicle region 310. As previously discussed, the central vehicle region 310 may be longitudinally bounded via the front and rear axles extending between the drive wheels 303 and the drive wheel 305, respectively.

In the second vehicle system arrangement 400, the first shaft opening 358 of a first outer housing 450 of the front electric drive axle assembly 402 may be proximate to the second vehicle frame section 372 and the second shaft opening 360 of the first outer housing 450 may be proximate to the first vehicle frame section 370. The first shaft opening 358 of a second outer housing 452 of the rear electric drive axle assembly 404 may be proximate to the first vehicle frame section 370 and the second shaft opening 360 of the second outer housing 452 may be proximate to the second vehicle frame section 372. Thus, the outer housings in the second vehicle system arrangement 400 and the first vehicle system arrangement 300 of FIG. 3 are oriented opposite one another.

In the second vehicle system arrangement 400, by positioning the first and second motor-generators in an inboard region (e.g., the central region 310) a likelihood of contact between the motor-generators and flying debris may be decreased. Therefore, the motor-generators may be more shielded in the inboard configuration of FIG. 4 than the outboard configuration of FIG. 3.

Similar to the first vehicle system arrangement 300 of FIG. 3, the front electric drive axle assembly 402 may be equivalently configured to the rear electric drive axle assembly 404 (e.g., positioning of a gear train, planetary gear assembly, differential, and/or the geometry of an outer housing of the axle assemblies may be the same). To elaborate, the gear train of each electric drive axle assembly may each have a plurality of selectable gear sets which may be substantially equivalent to one another, in one embodiment. In this way, manufacturing costs of the vehicle system can be reduced, if desired. Electrical interfaces 403 of each of the front and rear electric drive axle assemblies 402, 404 may extend upwards, along the y-axis, from each of the axle assemblies. However, the first motor-generator 406 may be configured to rotate in opposite rotational directions than the second motor-generator 408 to achieve forward and reverse motion of the vehicle 210, as described above.

For example, when viewing the front electric drive axle assembly along arrow 412, the first motor-generator 406 may spin in the ccw direction to achieve forward motion of the vehicle 210, as indicated by arrow 414. Viewing the second electric drive axle assembly 404 along arrow 416, an equivalent perspective relative to a geometry of the axle assemblies to arrow 412, the second motor-generator 408 may spin in the cw direction to similarly achieve forward motion of the vehicle 210. Conversely, when reverse motion (e.g., vehicle motion is opposite of the direction indicated by arrow 414) of the vehicle 210 is desired, the first motor-generator 406 may spin in the cw direction and the second motor-generator 408 may spin in the ccw direction.

By implementing the first electric drive axle assembly and the second electric drive axle assembly of both the first and second arrangements 300, 400 of FIGS. 3 and 4 with substantially equivalent configurations, a manufacturing of the axle assemblies may be simplified. A single electric drive axle assembly unit may, in some instances, be fabricated and used for both the front and rear electric drive axle assemblies therefore precluding separate identification and packaging of front versus rear axle assemblies.

Figure 5:
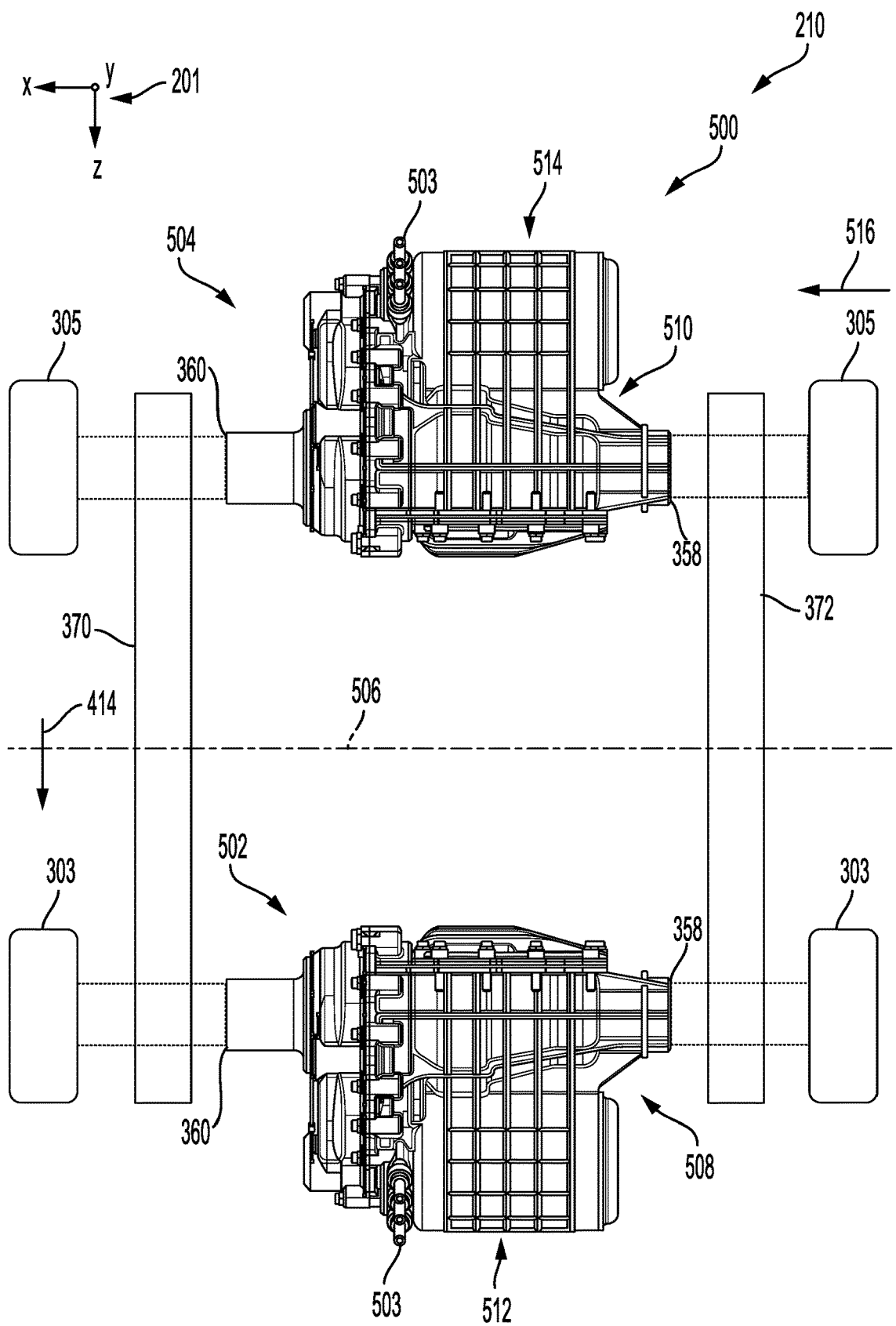
FIG. 5 shows a top-down view of a third arrangement of the front and rear electric drive axle assemblies.

In other examples, the vehicle system may have distinct front and rear electric drive axle assembly housings. As shown in FIG. 5 in a third vehicle system arrangement 500, a front electric drive axle assembly 502 and a rear electric drive axle assembly 504 may not be mirrored. For example, the front electric drive axle assembly 502 and the rear electric drive axle assembly 504 may be mirror images across a mirror plane 506, coplanar with the y-x plane. The layout of inner components, such as multiple selectable gear sets in each electric drive axle assembly, planetary gear sets, and differentials, of the axle assemblies may also be mirrored. As such, the internal components may have a similar form and size but a mirror arrangement. Thus, in such an example, at least a portion of the inner components of the drive axle assemblies may be substantially equivalent. Put another way, the internal gear train parts (e.g., gears, shafts, etc.) may be fabricated with manufacturing equivalency where the inner components may be constructed using an analogous manufacturing process to produce components having substantially similar sizes, profiles, and material constructions. It will be appreciated, however, that relatively small dimensional variances and other minor inconsistencies resulting from the type of manufacturing process may be present in components having a manufacturing equivalency. In this way, the manufacturing cost of the vehicle system can be reduced.

A first outer housing 508 of the front electric drive axle assembly 502 may be manufactured (e.g., cast, machined, etc.) as a mirror image of a second outer housing 510 of the rear electric drive axle assembly 504. Thus, the first and second outer housings 508, 510 may have different geometric profiles. For example, as shown in FIG. 5, the first shaft opening 358 of the first outer housing 508 may be proximate to the second vehicle frame section 372 and the second shaft opening 360 of the first outer housing 508 may be proximate to the first vehicle frame section 370. The first shaft opening 358 of the second outer housing 510 is also proximate to the second vehicle frame section 372 and the second shaft opening 360 of the second outer housing 510 is also proximate to the first vehicle frame section 370. However, a first motor-generator 512 of the front electric drive axle assembly 502 is positioned on an opposite side of the first and second shaft openings 358, 360 than a second motor-generator 514 of the rear electric drive axle assembly 504.

The inner components may be arranged within the first housing 508 in an opposite orientation from inner components enclosed in the second housing 510. As such, the first motor-generator 512 of the front electric drive axle assembly 502 may be configured to spin in the same direction as a second motor-generator 514 of the rear electric drive axle assembly 504 to achieve forward and reverse propulsion of the vehicle 210.

For example, when viewing the front and rear electric drive axle assemblies 502, 504 from an equivalent perspective relative to the geometries of the electric drive axle assemblies along arrow 516, the first motor-generator 512 may rotate in the ccw direction to rotate the front drive wheels 303 of the vehicle 210 also in the ccw direction to enable forward travel of the vehicle 210, as indicated by arrow 414. The second motor-generator 514 may also spin in the ccw direction to rotate the rear drive wheels 305 of the vehicle 210 in the ccw direction. Executable instructions implemented at the controller of the vehicle 210 may be simplified relative to the arrangements of FIGS. 3 and 4 to operate the first and second motor-generators 512, 514 in the same rotational direction for forward and reverse motion of the vehicle 210.

In addition, the mirrored configuration of the vehicle system 200 may allow drive and coast flanks of the gear trains of both the front and rear electric drive axle assemblies 502, 504 to be improved (e.g., optimized) for drive, regeneration, and reverse modes of vehicle operation. As mentioned above, when the front-rear electric drive axles are mirror the motor-generator may be rotated in a similar direction in forward and reverse drive modes. However, with regard to manufacturing, separate parts numbers and/or identifying markers may be needed when the mirrored configuration is implemented. Thus, gears, shafts, etc., of front and rear axles of the vehicle 210 may be manufactured with separate part numbers and identifying markers, in some cases.

In the third vehicle system arrangement 500, the front and rear electric drive axle assemblies 502, 504 are positioned in the outboard configuration where the first and second motor-generators 512, 514 are rotated away from the central region 310 of the vehicle 210. Electrical interfaces 503 of both the electric drive axle assemblies may extend upwards, along the y-axis, from the electric drive axle assemblies. The third vehicle system arrangement 500 may be implemented when operation of the motor-generators in the same rotational direction is desired while the central region 310 of the vehicle 210 is occupied by other vehicle components. In instances where space in the central region 310 is available, the vehicle system 200 may be arranged in the inboard configuration while maintaining the mirrored orientation of the electric drive axle assemblies, as shown in FIG. 6.

Figure 6:
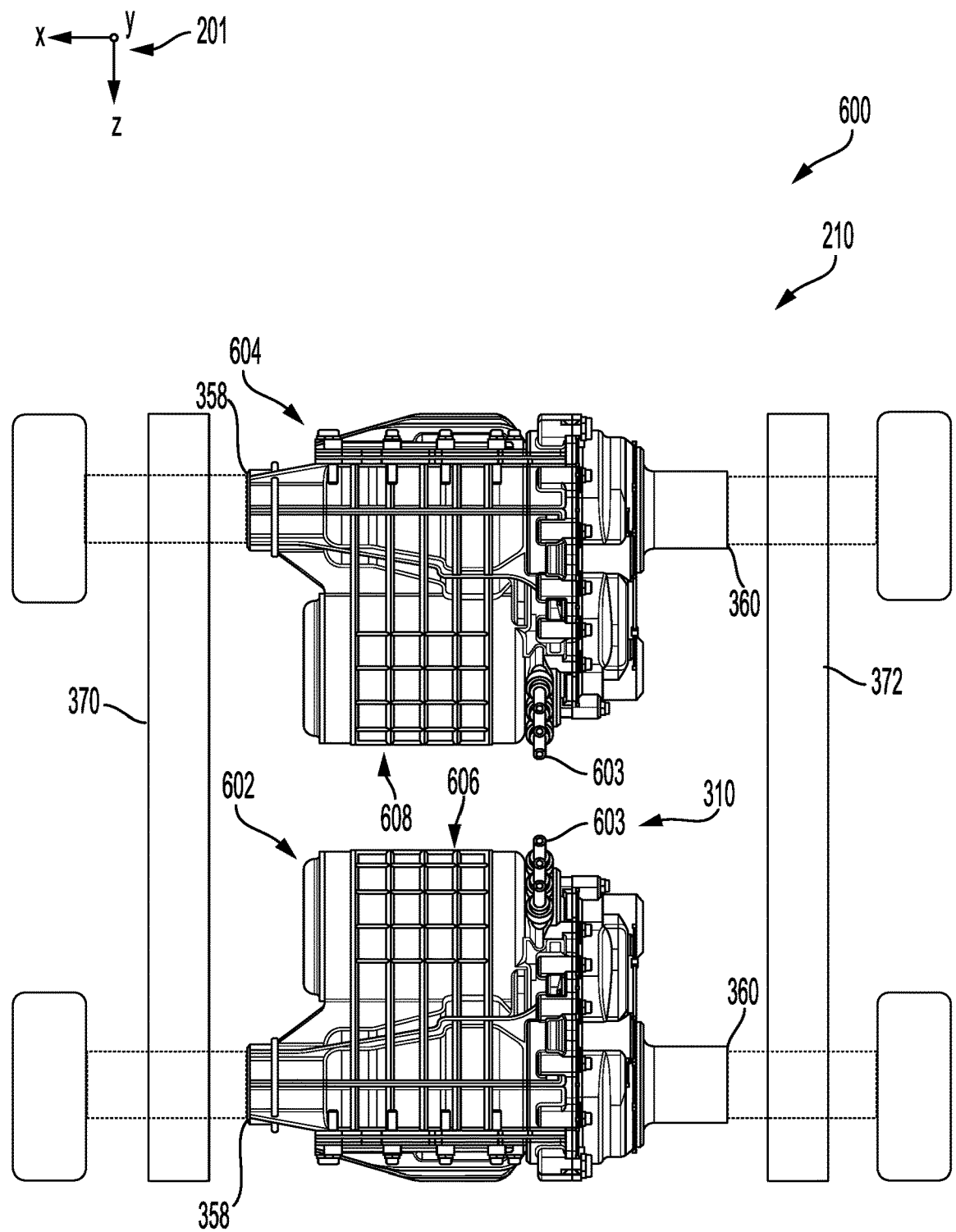
FIG. 6 shows a top-down view of a fourth arrangement of the front and rear electric drive axle assemblies.

FIG. 6 shows a fourth vehicle system arrangement 600. Similar to the third arrangement of FIG. 5, a front electric drive axle assembly 602 and a rear electric drive axle assembly 604 are mirrored. Electrical interfaces 603 of both axle assemblies extend upwards, along the y-axis. The fourth vehicle system arrangement 600 includes orienting the front and rear axle assemblies 602, 604 in the inboard configuration where the axle assemblies are rotated so that a first motor-generator 606 of the front electric drive axle assembly 602 and a second motor-generator 608 of the rear electric drive axle assembly 604 are situated in the central region 310 of the vehicle. In this way, the first and second motor-generators 606, 608 may be spun in the same rotational direction to compel forward or reverse drive of the vehicle 210, as well as activation of a regeneration mode, while maintaining the motor-generators in a position which reduces interactions between road debris and the motor-generators during vehicle motion.

In an alternate configuration of the vehicle system 200, the electric drive axle assemblies may have a same orientation in the vehicle. For example, FIG. 7 shows a fifth vehicle system arrangement 700, including a front electric drive axle assembly 702 and a rear electric drive axle assembly 704. The axle assemblies are oriented so that electrical interfaces 703 extend upwards, along the y-axis from the axle assemblies. The front and rear axle assemblies 702, 704 have substantially equivalent geometries, with components of each electric drive axle assembly configured similarly. In one example, the front and rear electric drive axle assemblies 702, 704 may be interchangeable without affecting operation of the axle assemblies.

The substantially equivalent geometries of the axle assemblies enables a first motor-generator 706 of the front electric drive axle assembly 702 and a second motor-generator 708 of the rear electric drive axle assembly 704 to be spun in a same rotational direction to achieve forward motion, as indicated by arrow 414, or reverse motion of the vehicle 210. A single electric drive axle assembly unit may be manufactured and applied to both the front axle and rear axle of the vehicle 210, thereby providing a simplified manufacturing process to implement the fifth vehicle system arrangement 700 of FIG. 7 (as well as a sixth vehicle system arrangement 800 shown in FIG. 8) in the vehicle 210 compared to the mirrored configurations of FIGS. 5 and 6. Furthermore, operation of the electric drive axle assemblies in the same rotational direction allows control of the axle assemblies to be streamlined compared to the rotated configurations of FIGS. 3 and 4.

The front and rear electric drive axle assemblies 702, 704 are oriented in FIG. 7 so that the first motor-generator 706 is behind, relative to the forward direction of motion indicated by arrow 710, an output shaft in a first gear train 712 of the front electric drive axle assembly 702 and the second motor-generator 708 is behind an output shaft in a second gear train 714 of the rear electric drive axle assembly 704. As described above, the output shafts of the gear trains are arranged co-axial to the shaft openings 358 and the shaft openings 360. The first motor-generator 706 is positioned in the central region 310 of the vehicle 210 and the second motor-generator 708 is positioned proximate to a rear end of the vehicle. The fifth vehicle system arrangement 700 may be used in a vehicle when space is available in the central region 310 behind the front axle 390 but not in front of the rear axle 392.

Alternatively, the axle assemblies may be rotated 180° about the y-axis to be oriented opposite from the fifth vehicle system arrangement 700 while maintaining the substantially equivalent and interchangeable geometries of the axle assemblies. For example, as shown in FIG. 8, a sixth vehicle system arrangement 800 includes positioning a front electric drive axle assembly 802 and a rear electric drive axle assembly 804 in a same orientation with electrical interfaces 803 of the axle assemblies extending upwards along the y-axis. As in the fifth vehicle system arrangement 700 of FIG. 7, the front and rear axle assemblies 802, 804 in the sixth vehicle system arrangement 800 may be interchangeable. However, in the sixth vehicle system arrangement 800 of FIG. 8, the axle assemblies may be manufactured and assembled so that a first motor-generator 806 is in front of an output shaft in a first gear train 808 of the front electric drive axle assembly 802 relative to the forward direction of motion of the vehicle 210, as indicated by arrow 414. Similarly, a second motor-generator 810 is positioned in front of an output shaft of a second gear train 812 of the rear electric drive axle assembly 804.

The second motor-generator 810 may be situated in the central region 310 of the sixth vehicle system arrangement 800 and the first motor-generator 806 may be positioned proximate to a front end of the sixth vehicle system arrangement. Thus, the sixth vehicle system arrangement 800 may be deployed when space is available in front of the rear axle 392 in the central region 310 but not behind the front axle 390.

In this way, an arrangement of the electric drive axle system may be selected based on a desired level of complexity of operation, manufacturing efficiency, packaging efficiency, and accommodation of other vehicle components according to available packaging space. In each of the vehicle system arrangements illustrated in FIGS. 3-8, the electric drive axle assemblies may be configured to maintain electrical interfaces oriented upwards to maintain electrical cables away from the ground and maintain a compact, space efficient footprint. The gear trains of each of the front and rear drive axle assemblies may have manufacturing equivalency with substantially equivalent gear ratios in multiple selectable gear sets of each gear train.

An example of a routine 900 for operating a vehicle equipped with any of the examples of a vehicle system, as shown in FIGS. 2-8, is depicted in FIG. 9. The vehicle system may include a first electric drive axle assembly, rotationally coupled to a front axle of the vehicle and a second electric drive axle assembly, rotationally coupled to a rear axle of the vehicle. The front axle is attached to front drive wheels of the vehicle and the rear axle is attached to rear drive wheels of the vehicle. Each of the first and second axle assemblies includes an electric motor-generator, a gear train, a planetary gear set and a differential rotationally coupled to the planetary gear set. The axle assemblies may be coupled to the vehicle axles so that output shafts of the gear trains are co-axial with the vehicle axles and the planetary gear sets and differentials are axially offset from the motor-generators.

Additionally, in some embodiments, the gear trains of the first and second axle assemblies may have substantially equivalent selectable gear ratios. The planetary gear sets of each of the gear trains may be both positioned longitudinally inboard from the motor-generators, longitudinally outboard from the motor-generators, or one planetary gear set may be longitudinally inboard from the corresponding motor-generator and the other planetary gear set may be longitudinally outboard from the corresponding motor-generator. Each of the first and axle assemblies may have outer housing which may have similar geometric profiles or different geometric profiles. However, the axle assemblies may be oriented so that electrical interfaces of each assembly extends upwards from the axle assemblies.

Routine 900 may be implemented when a change in vehicle operation mode occurs, such as when forward or reverse motion of the vehicle is requested from a stationary mode. Routine 900 may also be executed during vehicle navigation (e.g., the vehicle is already in motion, and a change in speed is requested).

At 902, the routine includes adjusting operation of the motor-generators of the first and second electric drive axle assemblies. As an example, the vehicle may be stationary and the motor-generators may be inactive. Upon receiving a request for vehicle motion at a vehicle controller (e.g., as indicated by an accelerator pedal tip-in for example) the controller may command activation of the motor-generators to drive rotation of the front and rear drive wheels. Alternatively the vehicle may already be in motion and an increase or decrease in vehicle speed may be indicated by a change in position of the accelerator pedal. A power of the motor-generators may be adjusted accordingly.

Rotational energy is transferred from the motor-generators to the front and rear drive wheels of the vehicle at 904. The energy may be transferred via rotation of rotor shafts of the motor-generators. As previously discussed, when the electric drive axle have inboard or outboard motor arrangements and their gear packaging is mirrored front-rear, the electric motor-generators in each axle may be rotated in a similar direction in both forward and reverse drive modes. However, when the electric drive axle have inboard or outboard motor arrangement and their gear packaging is symmetric front-rear, the electric motor-generators in each axle may be rotated in opposite directions in both forward and reverse drive modes.

At 906, the routine includes selecting gears according to vehicle operating conditions such as vehicle speed and electric motor efficiency. Clutch assemblies may be operated to engage and/or disengage components of the gear trains to adjust a gear ratio delivered to the front and rear drive wheels. The routine then returns to the start.

The technical effect of providing a vehicle system with multiple electric drive axles with planetary gear sets and selectable gears it to provide compact axle arrangements with increase gear range adaptability in the vehicle. Consequently, the vehicle's gearing may be selected to more aptly suite the vehicle's driving environment.

FIGS. 2-8 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

In a first embodiment, a system includes a first electric drive axle assembly with a first gear train having a first planetary gear set axially offset from a first electric motor-generator, wherein the first planetary gear set is rotationally coupled to a first differential, and a second electric drive axle assembly with a second gear train having a second planetary gear set axially offset from a second electric motor-generator, wherein the second planetary gear set is rotationally coupled to a second differential. In a first example of the system, the first gear train includes multiple selectable gear sets rotationally coupled to the first planetary gear set and the second gear train includes multiple selectable gear sets rotationally coupled to the second planetary gear set. A second example of the system optionally includes the first example, and further includes, wherein gear ratios of the multiple selectable gear sets in the first gear train are substantially equivalent to gear ratios of the multiple selectable gear sets in the second gear train. A third example of the system optionally includes one or more of the first and second examples, and further includes, wherein the first electric motor-generator includes a first housing and the second electric motor-generator includes a second housing having a different geometric profile than the first housing. A fourth example of the system optionally includes one or more of the first through third examples, and further includes, wherein one or more gears in the first gear train have a manufacturing equivalency to one or more gears in the second gear train. A fifth example of the system optionally includes one or more of the first through fourth examples, and further includes a first beam axle rotationally coupled to the first differential and a second beam axle rotationally coupled to the second differential. A sixth example of the system optionally includes one or more of the first through fifth examples, and further includes, wherein the first beam axle is arranged co-axial with a first output shaft in the first gear train and where the second beam axle is arranged co-axial with a second output shaft in the second gear train. A seventh example of the system optionally includes one or more of the first through sixth examples, and further includes, wherein a first electrical interface of the first electric motor-generator and a second electrical interface of the second electric motor-generator each extend upward from a housing of the corresponding electric motor-generator. An eighth example of the system optionally includes one or more of the first through seventh examples, and further includes, wherein the first planetary gear set is positioned longitudinally inboard from the first electric motor and where the second planetary gear set is positioned longitudinally inboard from the second electric motor and wherein housings of the first and electric drive axle assemblies have a mirrored geometric profile. A ninth example of the system optionally includes one or more of the first through eighth examples and further includes a controller including instructions stored in memory that when executed, during a forward or reverse drive mode, cause the controller to rotate the first electric motor-generator and the second electric motor-generator in opposite directions.

In another embodiment, a method includes transferring rotational energy from a first electric motor-generator through a first gear train to a first set of drive wheels, and transferring rotational energy from a second electric motor-generator through a second gear train to a second set of drive wheels, wherein the first gear train includes a first planetary gear set axially offset from the first electric motor-generator, wherein the first planetary gear set is rotationally coupled to a first differential, wherein the second gear train includes a second planetary gear set axially offset from the second electric motor-generator, and wherein the second planetary gear set is rotationally coupled to a second differential. In a first example of the method, transferring rotational energy from the first electric motor-generator through the first gear train to the first set of drive wheels includes rotating a first rotor shaft of the first electric motor-generator in a first rotational direction, and transferring rotational energy from the second electric motor-generator through the second gear train to the second set of drive wheels includes rotating a second rotor shaft of the second electric motor-generator in a second rotational direction opposite the first rotational direction. A second example of the method optionally includes the first example, and further includes, wherein each of the first and second planetary gear sets is positioned longitudinally inboard or outboard from their respective electric motor-generators. A third example of the method optionally includes one or more of the first and second examples, and further includes, wherein the steps of transferring rotational energy from the first electric motor-generator and the second motor-generator are implemented during a forward drive mode or a reverse drive mode. A fourth example of the method optionally includes one or more of the first through third examples, and further includes transitioning between selectable gear sets in the first gear train, and transitioning between selectable gear sets in the second gear train, wherein gear ratios of the selectable gear sets in the first gear train are substantially equivalent to gear ratios of the selectable gear sets in the second gear train.

In yet another embodiment, a system includes a first electric drive axle assembly with a first gear train having a plurality of selectable gear sets rotationally coupled to a first planetary gear set, wherein the first planetary gear set is axially offset from a first electric motor-generator and wherein the first planetary gear set is directly rotationally coupled to a first differential, and a second electric drive axle assembly with a second gear train having a plurality of selectable gear sets rotationally coupled to a second planetary gear set, wherein the second planetary gear set is axially offset from a second electric motor-generator and wherein the second planetary gear set is directly rotationally coupled to a second differential, wherein gear ratios of the plurality of selectable gear sets in the first gear train are substantially equivalent to gear ratios of the plurality of selectable gear sets in the second gear train. In a first example of the system, a first beam axle rotationally coupled to the first differential and a second beam axle rotationally coupled to the second differential and where the first beam axle is arranged co-axial to a first output shaft in the first gear train and where the second beam axle is arranged co-axial to a second output shaft in the second gear train. A second example of the system optionally includes the first example, and further includes, wherein the first electric motor-generator includes a first housing and the second electric motor-generator includes a second housing has a mirrored geometric profile in comparison to the first housing. A third example of the system optionally includes one or more of the first and second examples, and further includes, wherein each of the first and second planetary gear sets is positioned longitudinally inboard or outboard from their respective electric motor-generators. A fourth example of the system optionally includes one or more of the first through third examples, and further includes a controller including instructions stored in memory that when executed, during a forward or reverse drive mode, cause the controller to rotate the first electric motor-generator and the second electric motor-generator in opposite directions.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. A vehicle system comprising:
a first electric drive axle assembly with a first electric motor-generator rotationally coupled to a first gear train, wherein the first gear train is designed with multiple selectable gear sets and is rotationally coupled to a first differential, wherein the first differential is positioned on a lateral side of the first electric motor-generator, wherein the multiple selectable gear sets each include a gear positioned coaxial to a first intermediate shaft that is positioned between a first input shaft and a first output shaft; and
a second electric drive axle assembly with a second electric motor-generator and a second gear train, wherein the second gear train is designed with multiple selectable gear sets and is rotationally coupled to a second differential, wherein the second differential is positioned on a lateral side of the second electric motor-generator, wherein the multiple selectable gear sets each include a gear positioned coaxial to a second intermediate shaft that is positioned between a second input shaft and a second output shaft;
wherein gear ratios of the multiple selectable gear sets in the first gear train are substantially equivalent to gear ratios of the multiple selectable gear sets in the second gear train.

2. The vehicle system of claim 1, wherein the first gear train includes a first clutch assembly and a second clutch assembly that are positioned coaxial to the first output shaft and the second gear train includes a third clutch assembly and a fourth clutch assembly that are positioned coaxial to the second output shaft.

3. The vehicle system of claim 1, wherein one or more gears in the first gear train have a manufacturing equivalency to one or more gears in the second gear train.

4. The vehicle system of claim 1, wherein the first and second electric drive axle assemblies are beam axle assemblies that are continuous structures that are profiled to axially extend between drive wheels.

5. The vehicle system of claim 4, wherein the first beam axle is arranged co-axial with the first output shaft in the first gear train and where the second beam axle is arranged co-axial with the second output shaft in the second gear train.

6. The vehicle system of claim 1, wherein a first electrical interface of the first electric motor-generator and a second electrical interface of the second electric motor-generator each extend upward from a housing of the corresponding electric motor-generator.

7. The vehicle system of claim 2, wherein at least one of the first and second clutch assemblies is a friction clutch and at least one of the third and fourth clutch assemblies is a friction clutch.

8. The vehicle system of claim 1, further comprising a controller including instructions stored in memory that when executed, during a forward or reverse drive mode, cause the controller to:
rotate the first electric motor-generator and the second electric motor-generator in opposite directions.

9. A method for operation of a vehicle system, comprising:
transferring rotational energy from a first electric motor-generator through a first gear train to a first set of drive wheels; and
transferring rotational energy from a second electric motor-generator through a second gear train to a second set of drive wheels;
wherein the first gear train includes a first clutch assembly and a second clutch assembly;
wherein the first gear train is rotationally couple to a first planetary gear set that is rotationally coupled to a first differential;
wherein the second gear train includes a third clutch assembly and a fourth clutch assembly;
wherein the first clutch assembly and the third clutch assembly are substantially equivalent;
wherein the second clutch assembly and the fourth clutch assembly are substantially equivalent;
wherein the second gear train is rotationally coupled to a second planetary gear set that is rotationally coupled to a second differential; and
wherein gear ratios of the multiple selectable gear sets in the first gear train are substantially equivalent to gear ratios of the multiple selectable gear sets in the second gear train.

10. The method of claim 9, wherein:

transferring rotational energy from the first electric motor-generator through the first gear train to the first set of drive wheels includes rotating a first rotor shaft of the first electric motor-generator in a first rotational direction; and transferring rotational energy from the second electric motor-generator through the second gear train to the second set of drive wheels includes rotating a second rotor shaft of the second electric motor-generator in a second rotational direction opposite the first rotational direction.

11. The method of claim 10, wherein each of the first and second planetary gear sets is positioned longitudinally inboard or outboard from their respective electric motor-generators.

12. The method of claim 10, wherein the steps of transferring rotational energy from the first electric motor-generator and the second motor-generator are implemented during a forward drive mode or a reverse drive mode.

13. The method of claim 10, further comprising:

transitioning between selectable gear sets in the first gear train; and transitioning between selectable gear sets in the second gear train.

14. A vehicle system comprising:

a first electric drive axle assembly with a first electric motor-generator rotationally coupled to a first gear train having a plurality of selectable gear sets, a first clutch assembly, and a second clutch assembly; and a second electric drive axle assembly with a second electric motor-generator rotationally coupled to a second gear train having a plurality of selectable gear sets, a third clutch assembly, and a fourth clutch assembly;

wherein the first clutch assembly and the third clutch assembly are substantially equivalent;

wherein the second clutch assembly and the fourth clutch assembly are substantially equivalent; and wherein gear ratios of the plurality of selectable gear sets in the first gear train are substantially equivalent to gear ratios of the plurality of selectable gear sets in the second gear train.

15. The vehicle system of claim 14, further comprising a first differential rotationally coupled to a first planetary gear set that is rotationally coupled to the first gear train and a second differential that is rotationally coupled to a second planetary gear set that is rotationally coupled to the second gear train and wherein the first differential is arranged co-axial to a first output shaft in the first gear train and where the second differential is arranged co-axial to a second output shaft in the second gear train.

16. The vehicle system of claim 14, wherein the first electric motor-generator includes a first housing and the second electric motor-generator includes a second housing has a mirrored geometric profile in comparison to the first housing.

17. The vehicle system of claim 14, wherein each of the first and second planetary gear sets is positioned longitudinally inboard or outboard from their respective electric motor-generators.

18. The vehicle system of claim 14, further comprising a controller including instructions stored in memory that when executed, during a forward or reverse drive mode, cause the controller to:

rotate the first electric motor-generator and the second electric motor-generator in opposite directions.

* * * * *